United States Patent [19]
Schubring et al.
[11] Patent Number: 4,792,487
[45] Date of Patent: Dec. 20, 1988

[54] INK JET RECORDING MEDIUM COMPRISING (A) WATER EXPANSIBLE COLLOIDAL CLAY (B) SILICA AND (C) WATER INSOLUBLE SYNTHETIC BINDER

[75] Inventors: Herbert H. Schubring, Island Pond, Vt.; Donald R. Spalding, Whitefield, N.H.; Kenneth A. Pollart, Neenah, Wis.

[73] Assignee: James River Corporation of Virginia, Richmond, Va.

[21] Appl. No.: 24,832

[22] Filed: Mar. 12, 1987

[51] Int. Cl.[4] .......................... C08K 3/36; C08K 3/34; B41M 5/00

[52] U.S. Cl. ................................ 428/342; 346/135.1; 428/211; 428/537.5; 524/236; 524/393; 524/426; 524/446; 524/447; 524/450; 524/456; 524/493; 524/557; 524/575

[58] Field of Search ............... 524/236, 447, 456, 426, 524/493, 450, 446, 393; 428/211, 342, 537.5; 346/135.1

[56] References Cited

U.S. PATENT DOCUMENTS

| | | | |
|---|---|---|---|
| 3,927,237 | 12/1975 | Sund | 428/325 |
| 3,989,278 | 11/1976 | Torok et al. | 428/331 |
| 3,993,847 | 11/1976 | Kondo | 428/462 |
| 4,028,133 | 6/1977 | Isaac et al. | 427/146 |
| 4,038,101 | 7/1977 | Thompson | 427/150 |
| 4,042,412 | 8/1977 | Williams | 427/146 |
| 4,047,738 | 9/1977 | Isaac et al. | 427/151 |
| 4,071,646 | 1/1978 | Williams | 427/391 |
| 4,109,049 | 8/1978 | Thompson | 428/511 |
| 4,132,674 | 1/1979 | Hwang | 430/133 |
| 4,217,380 | 8/1980 | Medica et al. | 427/287 |
| 4,230,514 | 10/1980 | Becker et al. | 427/150 |
| 4,290,933 | 9/1981 | Becker | 524/405 |
| 4,409,272 | 10/1983 | McGibbon | 427/150 |
| 4,562,449 | 12/1985 | Baui et al. | 427/151 |

OTHER PUBLICATIONS

Derwent Abs 85-314058/50(J60219083) 11-1985 Mitsubishi Paper.
Derwent Abs 53566 E/26 (J57082085) 5-1982 Mitsubishi Paper.
Derwent Abs 79692 E/38 (J57129778) 8-1982 Judo Paper.
Derwent Abs 86-200660/31 (J51132376) 6-86 Lion Corp.
Derwent Abs 53566 E/26 (J57082085) Mitsubishi Paper.

*Primary Examiner*—Herbert J. Lilling
*Attorney, Agent, or Firm*—William A. Aguele; Thomas H. Whaley

[57] ABSTRACT

An ink jet printing substrate particularly useful as a coating for paper for multi-color, water base ink jet printing consisting essentially of a high swelling montmorillonite clay, and optionally including a high surface area pigment, such as a synthetic silica or calcium carbonate and a water-insoluble binder.

12 Claims, No Drawings

INK JET RECORDING MEDIUM COMPRISING (A) WATER EXPANSIBLE COLLOIDAL CLAY (B) SILICA AND (C) WATER INSOLUBLE SYNTHETIC BINDER

This invention relates to a recording material adapted for ink jet recording. In one of its more specific aspects, this invention relates to an improved ink jet recording paper. In another of its more specific aspects, this invention relates to a surface coating composition for paper which is especially suited for use in a multi-color ink jet printer.

Ink jet printing is true non impact printing. Images are produced by firing small drops or droplets of liquid ink onto a substrate. The printing head does not contact the surface of the sheet being printed.

Ink jet printers are required to do two things: (a) generate controlled drops of ink and (b) position the drops on the sheet. A "continuous" ink jet printer generates a stream of discrete droplets of uniform size and frequency. At least a portion of the droplets are charged and deflected either to form the desired pattern or to return to the ink reservoir. A "drop-ondemand" ink jet printer generates each droplet when required and does not require any deflecting mechanism. The droplets are generated on demand with a piezo crystal (oil can type) or with a capillary heater that creates a bubble for each ink drop.

The parameters of the printers that concern the producer of ink jet papers are drop size (drop volume); drop frequency; number of colored inks required (if multicolor printing); and type of ink (solvent, aqueous, hot melt).

Currently, most jet printing inks are water based, containing water soluble dyes (not pigments) and some high boiling polyalcohols (to avoid nozzle clogging). The soluble dyes are either acid or direct dyes. Inks are neutral or slightly alkaline (pH 7–9).

Papers for ink jet printing can be divided into two types: (a) uncoated for low quality printing and (b) coated for high quality (usually mutli-colored printing).

Uncoated papers generally contain high surface area pigments, either as fillers or added at the size press to help control dot spread. The objective is to make the sheet absorptive enough to permit rapid ink penetration but to minimize feathering and retain good circularity of dots after spreading.

Coated ink jet papers used for high quality multi-color printing are also required to have rapid ink absorption and correct dot spread. Because the ink is retained at the surface of the sheet in the coating layer, print quality is superior to that of an uncoated sheet where the ink has deeply penetrated the substrate.

Desirable properties of substrates or coatings for satisfactory color ink jet printing are described in U.S. Pat. No. 4,446,174, incorporated herein by reference. As disclosed in this patent, it is desirable that the substrate or coating absorb the dye from the ink without substantial penetration of the underlying recording to yield high color intensity and definition.

A primary object of this invention is to produce coated ink jet papers that provide high quality copy when used in multi-colored ink jet printers. Another object is to apply technology developed for coated papers to upgrade printing performance of size press coated papers.

We have discovered that an effective substrate for color ink jet printing consists essentially of a waterexpansible montmorillonite type clay, optionally combined wth a high surface area silica, silicate or calcium carbonate and a hydrophobic binder.

Synthetic silicates useful as pigments include calcium silicates, magnesium silicates and aluminum silicates. The term aluminum silicate as used herein is intended to include high surface area natural or synthetic silicates and silicoaluminates, including synthetic zeolites. Examples of suitable synthetic zeolites and method of preparation are disclosed in U.S. Pat. Nos. 2,739,073, 2,848,346, and 3,915,734.

In one of its more specific aspects, the substrate or coating composition of this invention consists essentially of a montmorillonite clay which may be applied to paper as an aqueous dispersion in one step on any suitable machine to provide the desired ink jet recording substrate at relatively low coating weights of the order of 3 to 10 pounds per ream (3000 square feet). The formulation consists essentially of a water-expansible clay, e.g., some bentonites or hectorites, consisting essentially of the mineral montmorillonite, or similar clay minerals having the montmorillonite structure.

In accordance with one preferred embodiment of this invention, the substrate composition consists of colloidal clay of the montmorillonite type, e.g. bentonite or hectorite. In another preferred embodiment the substrate optionally contains also one or more other pigments, a water insoluble synthetic resin binder, surfactant and a dispersant.

A particularly preferred composition of this invention consists essentially of a hydratable, film-forming colloidal clay of the montmorillonite type, preferably a purified bentonite or hectorite; a high surface area synthetic silica powder having relatively high oil absorption properties, e.g. an aerogel or hydrogel having a BET surface area of at least 250 square meters per gram and an oil absorption value greater than about 200 grams oil per 100 grams silica, preferably greater than 250 g/100 g; and a water insoluble synthetic latex resin binder.

Water-expansible, film-forming colloidal clays suitable for use in this invention are those selected from the group consisting of sodium bentonites, mixed sodium/-calcium bentonites and magnesium silicates of the hectorite type. Bentonites and hectorites marketed commercially under the trade names Gelwhite L, Gelwhite H., Bentolite L, SPCX-288 and SPCX 289 by E.C.C. America Inc., Gonzales, Tex.; and HPM-20, Polarite KB-325, Polarite 770, Polargel T, DPI-AW and DPI-SAP by American Colloid Company, Skokie, Ill., are satisfactory in these compositions.

Optionally, commonly used water insoluble pigment binders, e.g., those based on styrene-butadiene copolymers, acrylic latex, or polyvinyl acetate, may be included in the composition. Satisfactory binders include styrene-butadiene resins sold under the trade names CP-620, CP-640, CP-673A and XU30773.01 by Dow Chemical Co.; polyvinylacetates sold under the trade name Vinac 881 from Air Products and National 1109 from National Starch Co.; and acrylic latex binders sold under the trade names Rhoplex P-554, B-15, P-310, P-376, TR-407 by Rohm and Haas Co. Philadelphia, Pa. From 0 to 20 parts binder may be used with 100 parts by weight dry solids of the preferred hydratable pigment.

Other pigments, e.g., silica, silicate, calcium carbonate, satin white, barium sulfate, synthetic polymeric pigments (such as those obtained from polymers of styrene or urea-formaldehyde) may also be incorporated into the composition. Other common coating additives, such as cross linking agents, optical brighteners, dispersants, surfactants, etc. may be added but are not essential. Satisfactory dispersants include tetrasodium pyrophosphate (TSPP) and polyacrylic acid salts, e.g. the product sold under the trade name Dispex N-40 by Allied Colloids.

The essential ingredient is a water-expansible colloidal clay which serves as both binder and pigment. The montmorillonite clays have unusual adhesive qualities when applied as a water dispersion to solid surfaces. A particularly important property of the montmorillonite clays as a coating for ink jet recording paper is its capacity to absorb up to eight times its dry volume of water. The expansible layered structure of these clays also enables even distribution of the coating in application and calendering of the paper sheet. It is important that the clays used in the substrate are those which have not been acid treated or heated to a temperature sufficient to collapse the layered montmorillonite structure, destroying its absorptive qualities.

The major objective in producing coated ink jet paper is high pore volume in the coating layer and satisfactory coating strength. General complaints against conventional commercial papers are dot spreading and poor coating strength which causes dusting problems and makes for a poor printing and writing surface. The montmorillonite clays avoid this objection.

Dot spreading occurs when the void volume or absorbing capacity of the coating layer is insufficient to accommodate the amount of ink applied and therefore creates lateral migration. An important property of the montmorillonite clay as a substrate is that it provides very low penetration of the ink into the base sheet with controlled drop spread.

High surface are a synthetic silica, silicate or calcium carbonate pigments are the preferred supplemental pigments for the ink jet coating of this invention. Small amounts of these pigments added to the water expansible colloidal clay coatings of this invention increase the rapid absorption and color intensity of the applied ink jet inks. There are many commercially available synthetic silicas (precipitated, aerogels, or hydrogels). Surface areas range from 100–600 $m^2/g$, typically from 200 to 300 $m^2/g$ with oil absorption values in the range from 100 to 300 g/100 g pigment, typically from 150 to 250. Synthetic silicates and calcium carbonates of this same general particle size are also commercially available.

Synthetic latex binders may be used in the coating composition of this invention with pigments comprising 75–100 parts montmorillonite clay and 25-0 parts silica to produce high coating strength products. A preferred composition comprises 100 parts by weight pigment made up of 10 to 25 parts silica, silicate, or similar brighteners, with 75 to 90 parts colloidal montmorillonite type clay, e.g. bentonite or hectorite, and 5 to 20 parts by weight of a water insoluble synthetic resin binder. Lower levels of latex binder result in slightly more uniform colors than higher levels. A particularly preferred composition consists essentially of about 75 parts by weight bentonite, about 25 parts fine silica and 10 parts styrene-butadiene rubber solids. For the Diablo C-150 printer (2 inks down), required coat weights to accept 15 $g/m^2$ ink are approximately 5–9 lb/r.

The addition of a surfactant to the coating composition, although not essential, helps control ink absorption and improve letter sharpness. We have found that while a number of different surfactants may be used in our formulation, the flourosurfactants, for example, the flourosurfactants sold under the trade name Zonyl FSC by Du Pont Company, Wilmington, Del. are particularly effective in improving the sharpness of the letters. Improved letter sharpness may be obtained by the addition of about 1 part Zonyl FSC by weight per 100 parts dry pigment.

The substrate compositions of this invention are disclosed in greater detail in the following examples. The compositions were prepared and coated onto suitable paper by standard coating methods. Bar coaters, airknife coaters, between the roll coaters, curtain coaters, gravure coaters, and roll coaters are suitable for forming the substrate on paper in a single or multiple coating application.

The effectiveness of the substrate was determined visually by microscopic comparisons of the print quality from a commercial ink jet printer. The Xerox Diablo C-150 printer was used to test ink jet papers prepared in accordance with this invention. It is based on Sharp technology with a piezo crystal drop-on-demand "oil can" engine. The printing head contains four ink cartridges (black, magenta, cyan and yellow) that give the printer the ability to print seven colors (primary colors of black, magenta, cyan, and yellow, and secondary colors of red, green and blue). To obtain the secondary colors two inks are applied to the same location and it is seen that the number and volume of inks applied is a critical factor in paper requirements. Dot spacing is 120 dots per inch both horizontally and vertically. The printing head travels at approximately 14 ips (inches per second) and can apply 4 rows of dots per ink on each pass. For a single color, dots are separated by 0.6 milliseconds and by 5 milliseconds vertically (on the same pass). Second ink over-printing follows 35 milliseconds later for an adjacent ink cartridge (magenta and cyan or cyan and yellow) and 70 milliseconds later for magenta and yellow. When the printer is operating in the bidirectional mode, time between passes ranges from approximately 250 to 1500 milliseconds depending upon colors and location across the sheet.

Drop size (or drop volume) applied by a printer can be determined gravimentrically by printing a solid two color area of several square inches. Using a small preweighed sheet and printing two to four square inches followed immediately by weighing gives an acceptably accurate value of ink pick up. Pick up and dot frequency indicates drop volume. The direct measurement of ink pick up is the most critical parameter of an ink jet printer that affects paper requirements. For this printer, the ink pick up in a solid color area is 7.5 $g/m^2$ per ink (or 15 $g/m^2$ for two inks). Drop volume is $3.3\times10^{-7}$ ml and drop size is 86 microns (3.4 mils) diameter.

The ink employed is a typical water based jet ink containing approximately 10% PEG 200 and water soluble direct dyes with a pH of 10 and surface tension of approximately 50 dynes/cm. Other minor components of the ink are added for anti-corrosion, anti-foam, and biocidal purposes. PEG 200 is a polyethylene glycol that acts as a humectant and improves dye solubility. Direct dyes are essentially acid dyes (sodium salts of sulfonated molecules).

EXAMPLES 1 To 11

A series of compositions were prepared in which 100 parts of the pigment was mixed into water containing 0–5 parts dispersant at the solids and shear rate necessary to obtain a good, uniform dispersion of the pigment. Additional water and the binder, if used, were then added slowly and mixed in well. The final solids content of the mixtures were 15–20% dry solids.

The results obtained when these typical formulations are applied to a suitable paper substrate at 4–9 lbs./3000 sq. ft. and printed with the Diablo C-150 color ink jet printer are shown in Table 1.

TABLE 1

| | | | | Diablo C-150 Print Quality* | | | | Writing Quality* | |
|---|---|---|---|---|---|---|---|---|---|
| Example | Bentonite | Other Pigment | Binder | Drying Rate | Brightness | Letter Sharpness | Coating Strength | Pencil | Ball Point Pen |
| 1 | 100 pt Bentonite | none | none | 3 | 3 | 3 | 2 | 1 | 2 |
| 2 | 75/25 mixture of Bentonites | none | none | 2 | 3 | 3 | 2 | 1 | 2 |
| 3 | 75/25 mixture of Bentonites | none | 10 pts SBR | 2 | 3 | 2 | 1 | 1 | 2 |
| 4 | none | 100 pt fine silica | 25 pts PVOH | 1 | 1 | 2 | 5 | 5 | 4 |
| 5 | 80 pt Bentonite | 20 pt fine silica | 10 pt SBR | 1 | 2 | 1 | 1 | 1 | 2 |
| 6 | 90 pt Bentonite | 10 pt fine calcium carbonate | 10 pt SBR | 1 | 2 | 2 | 1 | 1 | 2 |
| 7 | 80 pt Bentonite | 20 pt clay | 10 pt SBR | 2 | 4 | 4 | 1 | 1 | 2 |
| 8 | 100 pt Bentonite | none | 10 pts PVAc | 2 | 3 | 3 | 1 | 1 | 2 |
| 9 | 100 pt Bentonite | none | 10 pts PVAcrylate | 2 | 3 | 3 | 1 | 1 | 2 |
| 10 | 100 pt Bentonite | none | 25 pt SBR | 4 | 4 | 4 | 1 | 1 | 2 |
| 11 | 75 pt Bentonite | 25 pt fine silica | 10 pt SBR** | 1 | 1 | 1 | 1 | 1 | 2 |

*Rated 1 to 5 with 1 = excellent and 5 = very poor
**Formulation also contains 1 pt flourosurfactant, Zonyl FSC, supplied by DuPont Company.

While a number of commercially available synthetic silicas were tested, those which gave the most satisfactory substrate compositions were products sold by SCM Corporations under the trade names Silcron G100, an aerogel-type synthetic fine particle silica having an average particle size of 3 microns, a BET surface area of 275 $m^2/g$ and an oil absorption of 270 g/100 g; Silcron G-640, a hydrogel-type synthetic fine particle silica having an average size of 4 microns, a BET surface area of 380$m^2/g$ and an oil absorption unless of 220 g/100 g; and Zeosyl 200, a synthetic precipitated silica produced by J.M. Huber Company having a BET surface area of 250 $m^2/g$ and an oil absorption of 185 g/100 g.

The latex binders used in these examples are acrylic/-vinyl acetate emulsion copolymers sold under the trade names Rhoplex P-310 and Rhoplex-335 by Rohn and Haas Company, Philadelphia, Pa.; styrene-butadiene copolymer latex sold under the trade names Dow 640 and Dow XU30773.01 by Dow Chemical Company Midland, Mich.; polyvinyl alcohol sold under the trade name Vinol 107 by Airco Chemicals Company, polyvinylacetate; and polyacrylates.

As evidenced from a comparison of coating strength and writing quality tests of Example 4 with those of Examples 1 to 3 and 5 to 11, the all silica pigment formulation is less satisfactory than those containing bentonites. The results obtained in Examples 5, 6 and 11 with bentonites and lesser amount of fine silica or calcium carbonate as brightness enhancers still provided excellent print brightness and improved coating strengths.

The bentonites included Polarite 770, a sodium bentonite marketed by American Colloid Company, Skokie, Ill. and a highly refined hectorite clay (hydrous magnesium silicate) sold under the trade name DPI-AW by American Colloid Company. A refined montmorillonite clay marketed under the trade name Gelwhite L by E.E.C. America Inc., Gonzales, Tex., is also suitable as coating. In Examples 2 and 3, a mixture of 75 parts SCPX-289 and 25 parts Gelwhite L was used to obtain an increase in the drying rate of the printing ink. Examples 5, 6, and 11 show that the addition of fine particle silica or calcium carbonate improved all print qualities.

The silica in Example 4 is made down with high speed mixing at 17% solids in the presence of a dispersant. The polyvinyl alcohol is made down at 10% solids. The polyvinyl alcohol is then added to the silica dispersion with good mixing.

The coating method used in these examples was the Meyer Rod Drawdown method. The coatings may be applied commercially by many different coating methods, e.g., by a between the roll coater or a reverse nip coater.

The coat weight in these examples was within the range of 7–9 lb./r (3000 $ft^2$). With the base sheet used for these comparative examples, this coat weight produced the best results based on the printing image of the Diablo C-150 ink jet printers.

We claim:

1. An ink jet recording medium comprising a substrate material consisting essentially of 100 parts by weight of a pigment composed of 70 to 90 parts by weight of a water-expansible colloidal clay of the montmorillonite type and 10 to 30 parts by weight of a finely divided silica having a surface area of at least 250 $m^2/g$ and an oil absorption value greater than about 175 g/100 g and 5 to 20 parts by weight of a water insoluble synthetic resin binder.

2. A recording medium according to claim 1 wherein the clay is a bentonite composed largely of montmorillonite.

3. A recording medium according to claim 1 wherein the clay is a hectorite.

4. A recording medium according to claim 1 wherein the substrate includes a surfactant.

5. A recording medium according to claim 4 wherein the surfactant is a fluorosurfactant.

6. A recording medium according to claim 1 wherein the substrate includes a water insoluble binder.

7. A recording medium according to claim 5 wherein the binder is selected from the group consisting of polymer solids of butadiene-styrene latex, acrylic latex, and polyvinylacetate.

8. An ink jet recording medium according to claim 1 wherein the pigment consists essentially of bentonite in an amount within the range of 75 to 80 parts by weight in admixture with 20 to 25 parts by weight of the finely divided silica.

9. An ink jet recording medium as defined in claim 1 wherein the pigment consists essentially of 75 parts by weight bentonite and 25 parts by weight of the finely divided silica and the binder is a styrene-butadiene solid copolymer in an amount equivalent to 10 parts binder to 100 parts pigment.

10. A paper coating composition comprising 100 parts by weight of a pigment composed of 10 to 25 parts by weight fine silica having a surface area of at least 250 $m^2/g$, 75 to 90 parts colloidal montomorillonite clay; and about 5 to 20 parts water insoluble synthetic resin binder; and about 1 part fluorosurfactant .

11. Ink jet recording paper comprising a paper base sheet surface-coated with 7 to 9 pounds per 3000 square foot ream of a composition comprising 10 to 25 parts by weight finely divided silica having a surface area of at least 250 $m^2/g$, 75 to 90 parts water expansible colloidal montmorillonite type clay; 5 to 20 parts water-insoluble synthetic resin binder; and about 1 part fluorosurfactant.

12. Ink jet recording paper according to claim 11 wherein the finely divided silica has a B.E.T. surface area greater than 200 and an oil absorption value of at least 175 g/100 g.

* * * * *